United States Patent [19]

Anderes

[11] Patent Number: 5,133,278

[45] Date of Patent: Jul. 28, 1992

[54] FOOD BREADING ASSEMBLY

[76] Inventor: Raymond M. Anderes, 327 Marquette St., La Salle, Ill. 61301

[21] Appl. No.: 655,610

[22] Filed: Feb. 15, 1991

[51] Int. Cl.$^5$ .............................................. A23G 3/26
[52] U.S. Cl. ...................................... 118/19; 118/22; 118/24; 118/309; 126/275 R; 206/221
[58] Field of Search ....................... 118/13, 19, 22, 24, 118/309; 126/275 R; 206/218, 221

[56] References Cited

U.S. PATENT DOCUMENTS

| | | | |
|---|---|---|---|
| 419,493 | 1/1890 | Blackburn | 126/275 R |
| 613,043 | 10/1898 | Kughler | 126/275 R |
| 1,103,169 | 7/1914 | Beam | 126/275 R |
| 1,137,359 | 4/1915 | Sleeper | 126/275 R |
| 1,569,264 | 1/1926 | Clark | 118/19 |
| 1,718,418 | 6/1929 | Hatch | 118/19 |
| 1,842,101 | 1/1932 | Kaufmann | 118/19 |
| 2,170,904 | 8/1939 | Kircher | 126/275 R |
| 2,616,391 | 11/1952 | Russell | 118/19 |
| 2,897,776 | 8/1959 | Black et al. | 118/19 |
| 3,225,735 | 12/1965 | Arcabasso | 118/19 |
| 3,696,778 | 10/1972 | Moore | 118/19 |
| 3,709,193 | 1/1973 | Moore | 118/19 |
| 3,739,743 | 6/1973 | McKee, Jr. | 118/19 |

Primary Examiner—W. Gary Jones
Assistant Examiner—Todd J. Burns
Attorney, Agent, or Firm—Ernest Kettelson

[57] ABSTRACT

A food breading assembly which includes a grid member sandwiched between an upper bin for holding food items to be breaded and a lower bin for holding breading material such as flour, bread crumbs, and the like. The upper and lower bins have aligned handles projecting from each side which the user can grasp with his hands to hold the upper and lower bins together and the grid sandwiched tightly between. The user can then shake the assembly causing the breading material to be propelled upwardly through the apertures of the grid to bread the food items in the upper bin. When completed, the upper bin is lifted off the grid with the breaded food on the grid. The grid has a pair of handles the user then grasps to lift the grid and breaded food thereon away from the lower bin, carry over to a cooking receptacle and drop the breaded food items therein without the user having to touch the food with his hands. The grid member has receiving channels to receive edge portions of the upper and lower bins and hold them in place while they are gripped together by the user and the food is being breaded.

13 Claims, 4 Drawing Sheets

FOOD BREADING ASSEMBLY

BACKGROUND OF THE INVENTION

This invention relates to the field of apparatus and machines to bread food. In particular, it relates to breading apparatus which is not operated by a power machine but is manually manipulated by the user and enables completion of the breading process as well as the cooking or baking process without the user touching the food after it has once been placed in the breading apparatus.

Prior art breading machines and apparatus known to the inventor include those disclosed in the following United States patents.

U.S. Pat. No. 3,739,743 discloses a motor driven drum which breads food items placed therein as it is rotated by the motor.

U.S. Pat. No. 3,709,193 discloses a machine for breading food by placing it in a perforated cylindrical housing and rotating the housing whereby the food items are breaded as they tumble within the cylindrical housing during rotation.

U.S. Pat. No. 3,696,778 discloses a machine for breading food comprising a perforated cylinder for the food items, and a hopper to feed breading material to the perforated cylinder and food therein as it is rotated.

U.S. Pat. No. 3,225,735 discloses an agitator for breading meats comprising a pan for the batter and a rotary drum for the breading material such as bread crumbs. The food items to be breaded are first dipped in the batter and then placed in the drum with the bread crumbs, whereupon the food items become breaded when the drum is rotated.

U.S. Pat. No. 2,897,776 discloses another rotary drum type of machine for "dusting" or breading food items with flour or other breading material. The laterally mounted flights projecting inwardly from the inner surface of the drum catches flour at the bottom portion as the drum rotates, carrying it upwardly to fall on the food item impaled on the axially positioned spit as the flights continue around the arcuate path of the drum.

U.S. Pat. No. 2,616,391 discloses a breading pan having an upper screen to serve as a cover for a lower screen member in the shape of a bowl to receive food between the two screens. Breading material is put in an outer pan, which penetrates through the screen when the outer pan with inner screen chamber is rotated or otherwise manipulated to cause the breading material to fall on the screen chamber which holds the food items.

U.S. Pat. No. 2,170,904 discloses a serving oven comprising an outer two part enclosure of metal such as aluminum for good heat conductivity, and an inner wire basket for the food items supported in spaced apart relation to the outer metal enclosure. The outer metal enclosure is placed in direct contact with a heat source, and the food items in the separately supported basket are heated without being scorched as would otherwise happen if in direct contact with the heated metal walls of the outer enclosure.

U.S. Pat. No. 1,842,101 discloses a coating apparatus comprising a box mounted for rotation and a basket supported therein having a mesh floor.

U.S. Pat. No. 1,569,264 discloses a device for "flouring" meats, vegetables and the like comprising a wire basket suspended in an outer container, and several vertical tines extending down in the basket to keep food items from becoming matted and to serve as agitators. Food items are placed in the wire basket together with flour or other breading material and the unit is shaken. When the wire basket is lifted out after the food items have been coated, the remaining flour falls through the screen into the outer container wherein it can be recovered and re-sifted for further use.

SUMMARY OF THE INVENTION

It is an object of the invention to provide a breading assembly which includes a rigid grid member sandwiched between an upper chamber having food items therein and a lower chamber having breading material therein, the breading material being propelled through the apertures of the grid as the assembly is shaken, the rigid grid member then being useable as a tray to carry the breaded food thereon to a cooking receptacle without the necessity of handling or in any way touching the breaded food items.

It is an object of the invention to provide a breading assembly comprising a rigid grid member having receiving channels to receive edge portions of an upper chamber having food items to be breaded and of a lower chamber having breading material to be propelled through the grid apertures when shaken to bread the food in the upper chamber, the upper and lower bins having aligned handles on opposite sides which the user can grasp to hold the chambers together and the grid sandwiched between without the need for clasps or other fastening devices to hold the assembly together during use.

DESCRIPTION OF PREFERRED EMBODIMENT

Figure 1:
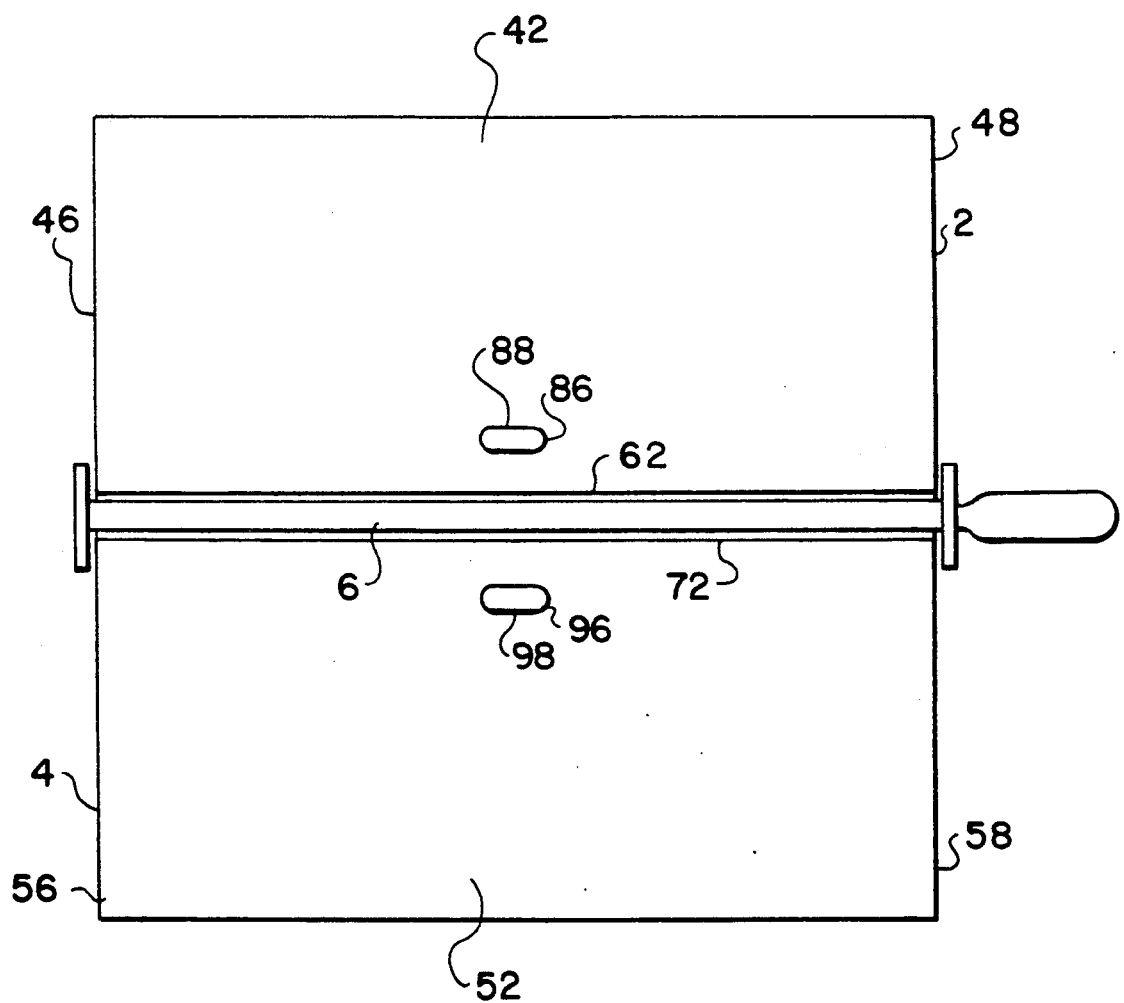
FIG. 1 is a side elevation view of a breading assembly in accordance with this invention.
Figure 2:
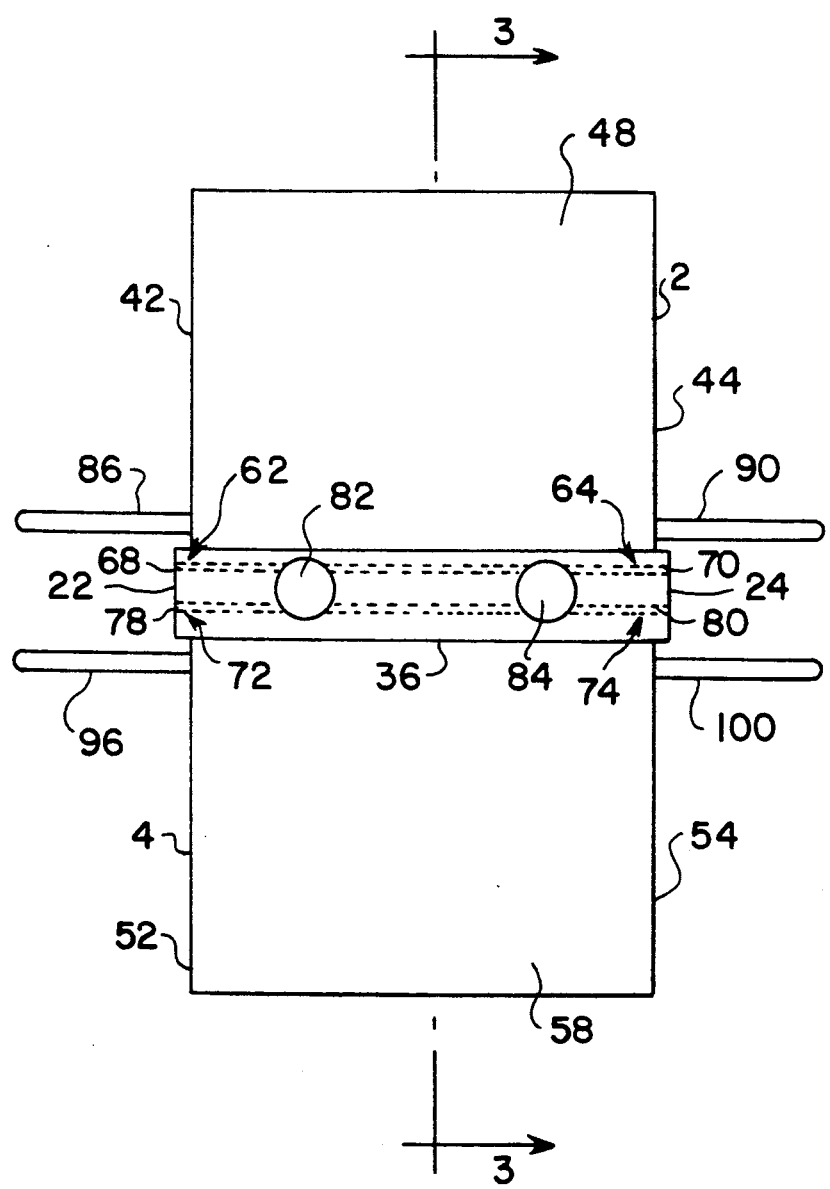
FIG. 2 is an end elevation view of the breading assembly shown in FIG. 1.
Figure 3:
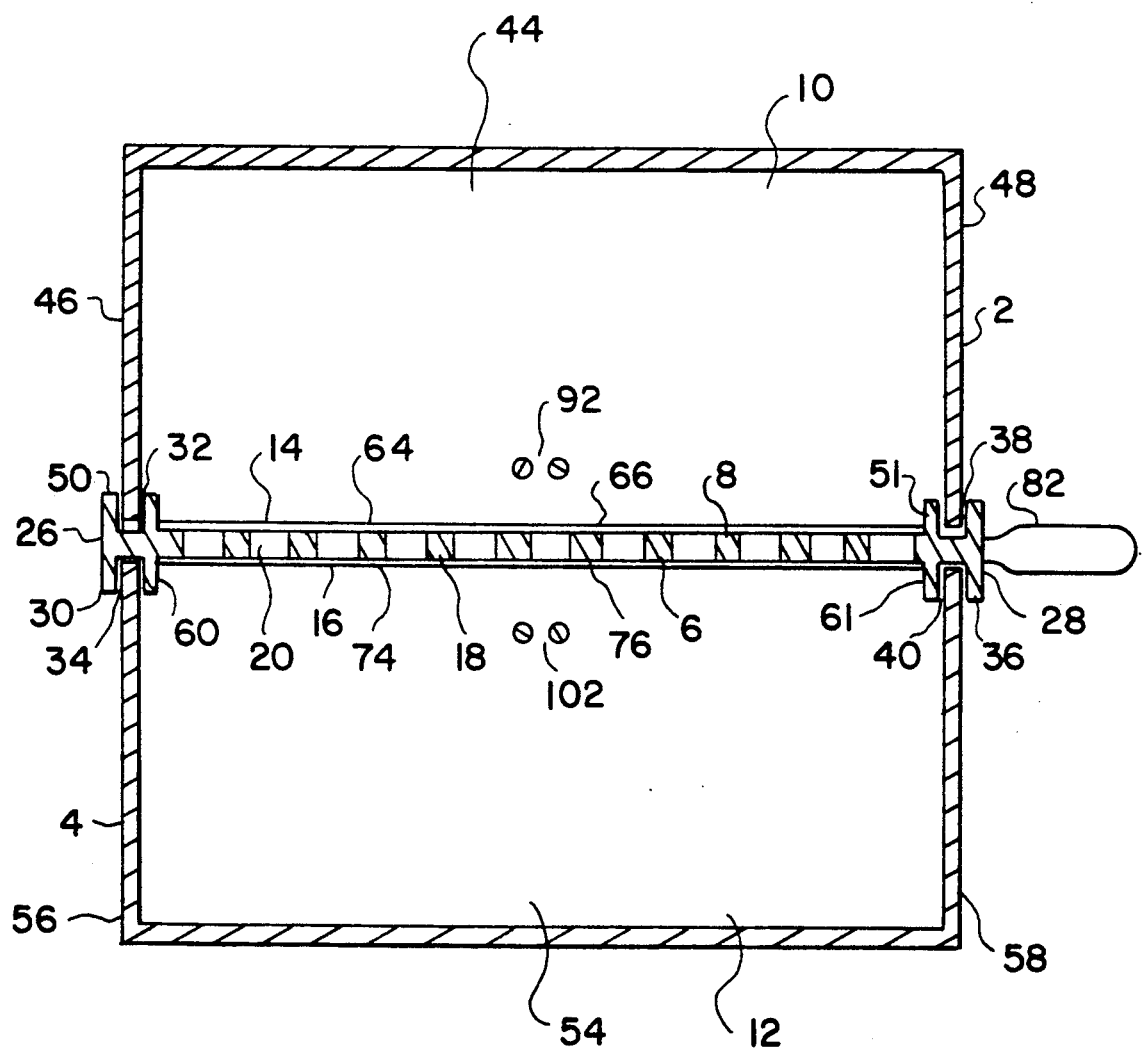
FIG. 3 is a section view taken on line 3—3 of FIG. 2.
Figure 4:
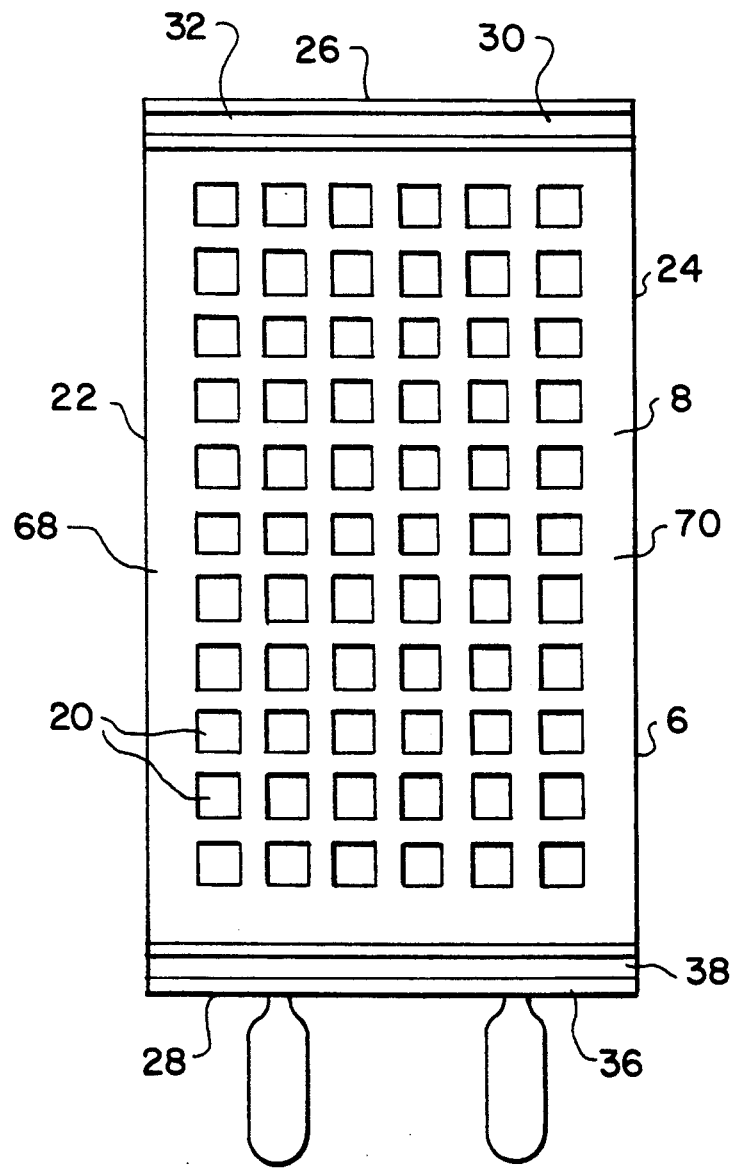
FIG. 4 is a plan view of the grid member of the breading assembly in accordance with this invention.

A food breading assembly in accordance with this invention comprises an upper bin 2 and a lower bin 4 with a grid 6 sandwiched therebetween. A food item or items to be breaded are placed on the upwardly facing surface 8 of the grid 6 within the cavity 10 of the upper bin 2, flour or other breading material is placed in the cavity 12 of the lower bin 4.

The open bottom wall 14 of the upper bin 2 faces the upwardly facing surface 8 of the grid 6 when in place thereagainst. The open top wall 16 of the lower bin 4 faces the downwardly facing surface 18 of the grid 6 when in place thereagainst.

While the upper and lower bins 2 and 4 are held together against the grid 6 sandwiched therebetween, with the open bottom wall 14 of the upper bin 2 facing the open top wall 16 of the lower bin 4 on opposite sides of the grid 6, the entire assembly is shaken in upward and downward directions to propel the flour or other breading material in the lower bin 4 upwardly through the apertures 20 of the grid 6 and into the cavity 10 of the upper bin 2.

The items of food in the upper bin 2 are thereby covered with the flour or other breading material when it enters the cavity 10 through the apertures 20 of the grid 6. The items of food themselves are periodically lifted off the upper surface 8 of the grid 6 as the assembly is shaken up and down, whereby all portions of the food items facing the grid are covered with the breading material in addition to all other surface portions of such food items.

The grid 6 is preferably rectangular in shape, having a longer pair of opposite side walls 22 and 24 connected by a shorter pair of opposite end walls 26 and 28. The side walls 22 and 24 are substantially parallel to each other. The end walls 26 and 28 are substantially parallel to each other.

A first H-shaped channel member 30 extends along end wall 26, having an elongated upwardly facing slot 32 and an elongated downwardly facing slot 34. A second H-shaped channel member 36 extends along the opposite end wall 28, having an elongated upwardly facing slot 38 and an elongated downwardly facing slot 40.

The upper bin 2 has the same preferably rectangular peripheral configuration as the grid 6, including a longer pair of opposite side walls 42 and 44 connected by a shorter pair of opposite end walls 46 and 48. The side walls 42 and 44 are substantially parallel to each other. The end walls 46 and 48 are substantially parallel to each other.

The end wall 46 of upper bin 2 terminates at its lower end in free edge 50 which borders the open bottom wall 14 of bin 2 along one end thereof. The end wall 48 of upper bin 2 terminates at its lower end in free edge 51 which borders the open bottom wall 14 of bin 2 along the opposite end thereof.

The lower bin 4 also has the same preferably rectangular peripheral configuration as the grid 6, including a longer pair of opposite side walls 52 and 54 connected by a shorter pair of opposite end walls 56 and 58. The side walls 52 and 54 are substantially parallel to each other. The end walls 56 and 58 are substantially parallel to each other.

The end wall 56 of lower bin 4 terminates at its upper end in free edge 60 which borders the open top wall 16 of the bin 4 along one end thereof. The end wall 58 of the lower bin 4 terminates at its upper end in free edge 61 which borders the open top wall 16 of bin 4 along the opposite end thereof.

The longest or longitudinal dimension of the upper bin 2 and lower bin 4 corresponds to the longest or longitudinal dimension of the grid 6 and the distance the oppositely facing slots 32 and 34 along end wall 26 are spaced apart from the corresponding oppositely facing slots 38 and 40 along end wall 28 of the grid 6. Thus, the free edge 50 of the upper bin 2 seats in the upwardly facing slot 32 along end wall 26 of the grid 6 and the free edge 51 of bin 2 seats in the upwardly facing slot 38 along the opposite end wall 28 of the grid 6. The free edge 60 of the lower bin 4 seats in the downwardly facing slot 34 along end wall 26 of the grid 6 and the free edge 61 of bin 4 seats in the downwardly facing slot 40 along the opposite end wall 28 of the grid 6.

When the free edges 50 and 51 of the end walls 46 and 48 of the upper bin 2 are received in the upwardly facing slots 32 and 38 of the grid 6, and fully seated therein, the free edges 62 and 64 of the side walls 42 and 44 are in full abutting contact with the upper surface 66 of the grid 6 along the upper edges 68 and 70 adjacent respective ones of the side walls 22 and 24 thereof. The cavity 10 of the upper bin 2 is completely closed when the bin 2 is thus seated in place against the upper surface 66 of the grid 6.

When the free edges 60 and 61 of the end walls 56 and 58 of the lower bin 4 are received in the downwardly facing slots 34 and 40 of the grid 6, and fully seated therein, the free edges 72 and 74 of the side walls 52 and 54 are in fully abutting contact with the lower surface 76 of the grid 6 along the lower edges 78 and 80 adjacent respective ones of the side walls 22 and 24 thereof. The cavity 12 of the lower bin 4 is completely closed when the bin 4 is thus seated in place against the lower surface 76 of the grid 6.

The grid 6 has a pair of handles 82 and 84 extending from its end wall 24 for a user to grasp after the food items in the upper bin 2 have been breaded and the bins 2 and 4 lifted away from the grid 6. The grid 6 with food items thereon can then be carried to the cooking pan or whatever other cooking implement is to be used to hold the food items while being cooked, broiled, baked or the like. It is therefore not necessary for the user of the breading assembly in accordance with this invention to touch the food items with his hands after they have been breaded and are to be placed in a cooking receptacle. The grid 6 is rigid and the handle 82 and 84 are rigidly affixed to the end wall 28 of the grid and extend rigidly therefrom. They do not bend or flex when the grid 6 with breaded food items thereon is lifted by the handles 82 and 84 and held thereby in a horizontal position. The upper surface of the grid 6 is substantially planar. The lower surface of the grid 6 is also substantially planar.

The upper bin 2 has a first handle 86 projecting outwardly from its side wall 42 approximately at its mid-point 88 and spaced apart inwardly thereof and upwardly from its free edge 62 about an inch, and a second handle 90 projecting outwardly from its opposite side wall 44 approximately at its mid-point 92 and spaced apart inwardly thereof and upwardly from its free edge 64 about an inch.

The lower bin 4 has a first handle 96 projecting outwardly from its side wall 52 approximately at its mid-point 98 spaced apart inwardly thereof and downwardly from its free edge 72 about an inch, and a second handle 100 projecting outwardly from its opposite side wall 54 approximately at its mid-point 102 and spaced apart inwardly thereof and downwardly from its free edge 74 about an inch.

When the upper bin 2 and lower bin 4 are in place against the grid 6 sandwiched therebetween as described above, the first handle 86 of bin 2 and the first handle 96 of bin 4 are in alignment one above the other and spaced apart a distance of about two and a half to three inches depending on the thickness of the grid 6 sandwiched between the bins 2 and 4. The thickness of the grid 6 may be any convenient and appropriate dimension, such as one-half inch to as much as an inch.

At such time, the second handle 90 of bin 2 and the second handle 100 of bin 4, which project from the opposite sides of bins 2 and 4, are also in alignment one above the other and spaced apart a distance of about two and a half to three inches.

The said distance the first handles 86 and 96, and the second handles 90 and 100, are spaced apart is such that a user can grasp both first handles 86 and 96 with one hand, and can grasp both second handles 90 and 100 with his other hand, and squeeze them together to hold the upper bin 2 and lower bin 4 tightly against the respective upper and lower surfaces of the grid 6 while at the same time shaking them upwardly and downwardly to propel breading material from the lower bin 4 upward through the aperture 20 of the grid 6 to cover the bread the food items above the grid 6 in the upper bin 2.

To use the breading assembly in accordance with this invention, a desired quantity of breading material such as flour or bread crumbs is placed in the lower bin 4. The grid 6 is then seated on top of the lower bin 4, with the upper free edges 60 and 61 of the end walls of the lower bin 4 received in the downwardly facing slots 34 and 40 of the H-channel members 26 and 28 of the grid 6.

Food items to be breaded are then placed on the upper surface of the grid 6.

The upper bin 2 is then placed over the top of the grid 6, with the lower free edges 50 and 51 of the end walls of the upper bin 2 received in the upwardly facing slots 32 and 38 of the H-channel members 26 and 28 of the grid 6.

The handles 86 and 96 on one side of the upper and lower bins 2 and 4 are then grasped by the user with one hand. The handles 90 and 100 on the other side of the upper and lower bins 2 and 4 are then grasped by the user with his other hand. He squeezes the handles together to hold the bins 2 and 4 tightly together with the grid 6 sandwiched therebetween, and he then shakes the breading assembly up and down to cause the breading material in the lower bin 4 to pass through the apertures 20 of the grid 6 into the upper bin 2 where it coats and breads the food items therein.

After the food items in the upper bin 2 and on the upper surface of the grid 6 have been sufficiently coated with the breading material, the breading assembly is set down on a table or counter with the lower bin 4 resting thereon. The upper bin 2 is then lifted off and placed aside.

The user then grasps the handles 82 and 84 of the grid 6 and lifts the grid 6 with breaded food items thereon off from the lower bin 4. The user carries the grid 6 and breaded food items thereon to a cooking receptacle and tips the grid to deposit the food items in such cooking receptacle which may then be put in an oven or broiler for baking or broiling.

Throughout the entire breading process, after the food items have been placed on the grid 6 prior to breading, it is not necessary for the user to any person to touch the food items until the breading process as well as the cooking, baking or broiling process has been completed.

I claim:

1. A breading assembly, comprising a rigid carrier member having a planar carrier surface and an oppositely facing surface, a plurality of apertures through said rigid carrier member opening to said planar carrier surface and to said oppositely facing surface, food containing means having an open wall facing said planar carrier surface of said rigid carrier member, breading material containing means having an open wall facing said oppositely facing surface of said rigid carrier member, said rigid carrier member being sandwiched between said food containing means and said breading material containing means and held in place therebetween by receiving means to receive and releasably hold said food containing means in position against said rigid carrier member on said planar carrier surface side thereof, and second receiving means to receive and releasably hold said breading material containing means in position against said rigid carrier member on said oppositely facing side thereof, said food containing means and breading material containing means having hand grasp means to enable a user to hold said food containing means against said planar carrier surface side of said carrier member and said breading material containing means against said oppositely facing surface side of said rigid carrier member with said rigid carrier held securely therebetween and to enable said user to shake and manipulate said held together breading assembly to cause breading material in said breading material containing means to pass through said apertures of said rigid carrier member into said food containing means to bread food items container thereon, said hand grasp means includes a plurality of rigid projecting members, at least one of which is rigidly secured to said containing means to project rigidly outwardly therefrom, at least one of which is rigidly secured to said breading material containing means to project rigidly outward therefrom at a location in juxtaposition with said one of said projecting members which is rigidly secured and projects rigidly outwardly from said food containing means, said projecting member of said food containing means and said projecting member of said breading material containing means being rigidly supported in one-above-the-other and spaced apart relationship when each of said containing means is held in place against opposite sides of said rigid carrier member.

2. A breading assembly as set forth in claim 1, wherein said food containing means comprises a first bin having a food containing cavity opening to said open wall of said food containing means, and a solid peripheral wall extending from said open wall around the remaining portions of said food containing cavity.

3. A breading assembly as set forth in claim 2, wherein said breading material containing means comprises a second bin having a breading material containing cavity opening to said open wall of said breading material containing means, and a solid peripheral wall extending from said open wall around the remaining portions of said breading material containing means.

4. A breading assembly as set forth in claim 3, wherein said plurality of rigid projecting members of said hand grasp means includes a first handle extending outwardly from said solid peripheral wall of said first bin, said first handle being said one of said rigid projecting member secured to said food containing means, a second handle extending outwardly from said solid peripheral wall of said first bin at a position opposite from said first handle, a third handle extending outwardly from said solid peripheral wall of said second bin, said third handle being said one of said rigid projecting members secured to said breading material containing means, a fourth handle extending outwardly from said solid peripheral wall of said second bin at a position opposite from said third handle, said first and third handles being positioned in juxtaposition with each other when said first and second bins are in place against their respective surfaces of said rigid carrier member to enable a user to grasp said first and third handles to hold them together with one hand, said second and fourth handles being positioned in juxtaposition with each other when said first and second bins are in place against their respective surfaces of said rigid carrier member to enable a said user to grasp said second and fourth handles to hold them together with his other hand, said rigid carrier member being thereby sandwiched between said first and second bins and thereby held in place.

5. A breading assembly as set forth in claim 1, wherein said rigid carrier member includes a first carrier handle extending outwardly therefrom for a user to grasp and carry breaded food items on its said planar carrier surface side to a cooking receptacle and deposit said breaded food items therein, after said food items have been breaded and said food containing means and said breading material containing means have been separated from said rigid carrier member.

6. A breading assembly as set forth in claim 5, wherein said rigid carrier member includes a second carrier handle extending outwardly therefrom, whereby a said user can grasp said first carrier handle with one hand and said second carrier handle with his other hand to carry breaded food items on said planar carrier surface side of said rigid carrier member to a said cooking receptacle and to deposit said breaded food items therein.

7. A breading assembly comprising a rigid carrier member having a planar carrier surface and an oppositely facing surface, a plurality of apertures through said rigid carrier member opening to said planar carrier surface and to said oppositely facing surface, food containing means having an open wall facing said planar carrier surface of said rigid carrier member, breading material containing means having an open wall facing said oppositely facing surface of said rigid carrier member, said food containing means and breading material containing means having hand grasp means to enable a user to hold said food containing means against said planar carrier surface side of said rigid carrier member and said breading material containing means against said oppositely facing surface side of said rigid carrier member with said rigid carrier held securely therebetween and to enable said user to shake and manipulate said held together breading assembly to cause breading material in said breading material containing means to pass through said apertures of said rigid carrier member into said food containing means to bread food items contained thereon, wherein said rigid carrier member includes first receiving means to receive and releasably hold said food containing means in position against said rigid carrier member on said carrier surface side thereof, wherein said food containing means includes peripheral side wall means to surround the sides of a cavity thereof, including said cavity of said food containing means, said peripheral side wall means including a first food containing means wall terminating at a first laterally extending free edge bordering said open wall of said food containing means, said first receiving means of said rigid carrier member including a first laterally extending channel member having a laterally extending slot therein to receive said first laterally extending free edge of said first food containing means wall and releasably hold said food containing means in position against said rigid carrier member on said planar carrier surface side thereof.

8. A breading assembly as set forth in claim 7, wherein said peripheral side wall means of said food containing means includes a second food containing means wall terminating at a second laterally extending free edge bordering said open wall of said food containing means, said first receiving means of said rigid carrier member including a second laterally extending channel member having a laterally extending slot therein to receive said second laterally extending free edge of said second food containing means wall and releasably hold said food containing means in position against said rigid carrier member on said planar carrier surface side thereof.

9. A breading assembly as set forth in claim 8, wherein said rigid carrier member includes a first laterally extending edge, a second laterally extending edge substantially parallel to said first laterally extending edge and spaced apart thereof along the opposite edge of said rigid carrier member, said first laterally extending channel member extending along said first laterally extending edge of said rigid carrier member, said laterally extending slot of said first laterally extending channel member opening in the same direction in which the planar carrier surface side of said rigid carrier member faces, said second laterally extending channel member extending along said second laterally extending edge of said rigid carrier member, said laterally extending slot of said second laterally extending channel member opening in the same direction in which the planar carrier surface side of said rigid carrier member faces.

10. A breading assembly comprising a rigid carrier member having substantially planar carrier surface and an oppositely facing surface, a plurality of apertures through said rigid carrier member opening to said planar carrier surface and to said oppositely facing surface, food containing means having an open wall facing said planar carrier surface of said rigid carrier member, breading material containing means having an open wall facing said oppositely facing surface of said rigid carrier member, said food containing means and breading material containing means having hand grasp means to enable a user to hold said food containing means against said planar carrier surface side of said rigid carrier member and said breading material containing means against said oppositely facing surface side of said rigid carrier member with said rigid carrier held securely therebetween and to enable said user to shake and manipulate said held together breading assembly to cause breading material in said breading material containing means to pass through said apertures of said rigid carrier member into said food containing means to bread food items contained thereon, wherein said rigid carrier member includes first receiving means to receive and releasably hold said food containing means in position against said rigid carrier member on said planar carrier surface side thereof, wherein said rigid carrier member includes second receiving means to receive and releasably hold said breading material containing means in position against said rigid carrier member on said oppositely facing surface side thereof, wherein said breading material containing means includes peripheral side wall means to surround the sides of a cavity thereof, including said cavity of said breading material containing means, said peripheral side wall means including a first breading material containing means wall terminating at a first laterally extending free edge bordering said open wall of said breading material containing means, said second receiving means of said rigid carrier member including a first laterally extending channel member of said second receiving means having a laterally extending slot therein to receive said first laterally extending free edge of said first breading material containing means wall and releasably hold said breading material containing means in position against said rigid carrier member on said oppositely facing surface side thereof.

11. A breading assembly as set forth in claim 10, wherein said peripheral side wall means of said breading material containing means includes a second breading material containing means wall terminating at a second laterally extending free edge bordering said open wall of said breading material containing means, said second receiving means of said rigid carrier member including a second laterally extending channel member of said second receiving means having a laterally extending slot therein to receive said second laterally extending free edge of said second breading material containing means wall and releasably hold said breading material containing means in position against said rigid carrier member on said oppositely facing surface side thereof.

12. A breading assembly as set forth in claim 11, wherein said rigid carrier member includes a first laterally extending edge, a second laterally extending edge substantially parallel to said first laterally extending edge and spaced apart thereof along the opposite edge of said rigid carrier member, said first laterally extending channel member of said second receiving means extending along said first laterally extending edge of said rigid carrier member, said laterally extending slot of said first laterally extending channel member of said second second receiving means opening in the same direction in which the oppositely facing surface side of said rigid carrier member faces, said second laterally extending channel member of said second receiving means extending along said second laterally extending edge of said rigid carrier member, said laterally extending slot of said second laterally extending channel member of said second receiving means opening in the same direction in which the oppositely facing surface side of said rigid carrier member faces.

13. A breading assembly comprising a rigid carrier member having a planar carrier surface and an oppositely facing surface, a plurality of apertures through said rigid carrier member openings to said planar carrier surface and to said oppositely facing surface, food containing means having an open wall facing said planar carrier surface of said rigid carrier member, breading material containing means having an open wall facing said oppositely facing surface of said rigid carrier member, said food containing means and breading material containing means having hand grasp means to enable a user to hold said food containing means against said planar carrier surface side of said rigid carrier member and said breading material containing means against said oppositely facing surface side of said rigid carrier member with said rigid carrier held securely therebetween and to enable said user to shake and manipulate said held together breading assembly to cause breading material in said breading material containing means to pass through said apertures of said rigid carrier member into said food containing means to bread food items contained thereon, wherein said food containing means comprises a first bin having a food containing cavity opening to said open wall of said food containing means, and a solid peripheral wall extending from said open wall around the remaining portions of said food containing cavity, wherein said breading material containing means comprises a second bin having a breading material containing cavity opening to said open wall of said breading material containing means, and a solid peripheral wall extending from said open wall around the remaining portions of said breading material containing means, wherein said rigid carrier member is substantially rectangular in peripheral configuration having a first end edge, a second end edge spaced apart from said first end edge and substantially parallel thereto, and a pair of spaced apart side edges extending between opposite ends of said spaced apart first and second end edges, a first receiving channel along said first end edge having a first receiving slot opening upwardly, a second receiving channel along said second end edge having a second receiving slot opening upwardly, a third receiving channel along said first end edge having a third receiving slot opening downwardly, a fourth receiving channel along said second end edge having a fourth receiving slot opening downwardly, said first and third receiving slots being aligned in one above the other relationship, said second and fourth receiving slots being aligned in one above the other relationship, said first bin being substantially rectangular in peripheral configuration having a first end wall and a first end wall free edge thereof to be received in said first receiving slot and a second end wall spaced apart from said first end wall and substantially parallel thereto, said second end wall having a second end wall free edge to be received in said second receiving slot when said first bin is in place against said rigid carrier member on said planar carrier surface side thereof, said second bin being also substantially rectangular in peripheral configuration having a first end wall and a first end wall free edge thereof to be received in said third receiving slot and a second end wall of said second bin spaced apart from said first end wall thereof and substantially parallel thereto, said second end wall of said second bin having a second end wall free edge to be received in said fourth receiving slot when said second bin is in place against said rigid carrier member on said oppositely facing surface side thereof.

* * * * *